Dec. 18, 1962 D. RAIMONDI 3,068,533
METHOD OF IMPREGNATING AND COVERING ELECTRIC WINDINGS
Filed Nov. 30, 1959
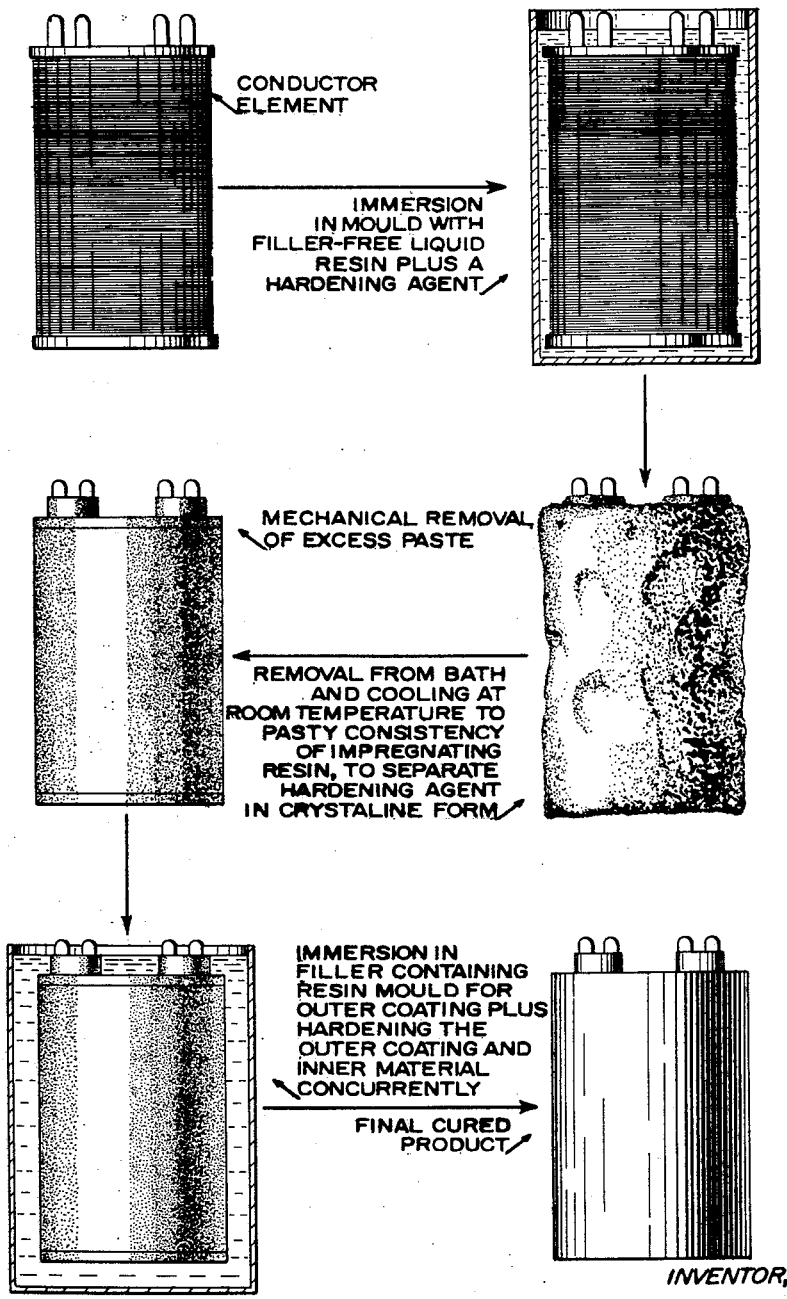
INVENTOR,
Donato Raimondi
by Wenderoth, Lind & Ponack
Attorneys

United States Patent Office 3,068,533
Patented Dec. 18, 1962

3,068,533
METHOD OF IMPREGNATING AND COVERING ELECTRIC WINDINGS
Donato Raimondi, Milan, Italy, assignor to Ciba Limited, Basel, Switzerland, a Swiss firm
Filed Nov. 30, 1959, Ser. No. 856,024
Claims priority, application Switzerland Dec. 8, 1958
1 Claim. (Cl. 18—59)

This invention provides a method of impregnating and covering electric windings, for example, windings and wound bodies used in transformers or current or voltage changers, and also, for example, condenser windings, with a hardenable composition capable of being cast.

Articles of the above kind have been known for a long time, in which the enclosing composition constitutes the outer covering of the winding and also the insulation between the conductors or other parts of the winding, and protects the latter against mechanical injury as well as insulates them. In order to produce adequate insulation the winding must be impregnated with the castable composition, and, in order to prevent glow discharges and consequent breakdown, no air must remain occluded within the turns and other parts of the winding. The impregnation is usually carried out at a raised temperature in vacuo, whereby the moisture present in the winding and insulation material is removed and the risk of occlusions of air or other gas is substantially precluded. The winding so impregnated is then provided with a covering consisting of a composition to which a filler, for example, quartz meal, has been added in order to increase the strength, surface hardness, etc. of the outer covering. The filler also reduces the exothermic reaction in the case of large volumes of resin, and lowers the shrinkage and expansion coefficient of the body. As the covering composition has physical properties, for example, coefficient of expansion, etc., differing somewhat from those of the composition used for the impregnation or of the winding impregnated therewith, there is a risk that cracks and cavities may form between the two compositions, whereby the mechanical and electrical strengths (glow discharges) of the finished article is reduced.

A method is known in which the winding is first impregnated under reduced pressure with a heat-hardenable artificial resin. The body so obtained, after the impregnating resin has hardened, is roughened by mechanical means on its outer surface, and is provided with an outer covering in a second and separate step. This method is time-consuming, because two successive hardening operations are necessary between which a mechanical treatment is interposed, and because strong adhesion and bubble-free and fissure-free union between the impregnating composition and the covering composition cannot be attained with certainty.

A further method is known in which the aforesaid two steps are combined and carried out in a single mould. In the first step the winding is impregnated under reduced pressure with a castable resin alone. Then the castable resin to which filler has been added is introduced into the same mould while maintaining the reduced pressure in such manner that the filler-containing resin displaces the filler-free resin which is outside the winding and, after being hardened, forms the outer covering. This method is disadvantageous, as all the casting operations must be carried out under reduced pressure with a relatively complicated apparatus, the mould required for the final casting operation is occupied throughout the entire process, including the impregnating operation, and the filler-free resin displaced from the mould is unusable having regard to the pot life of the resin and the impurities taken up during displacement from the mould, so that the displaced resin is lost.

The present invention, which is illustrated by the accompanying drawing in diagrammatic form, provides a method which is simpler than the known methods, for impregnating and covering electric windings with castable artificial resins capable of being hardened by heat, wherein the winding is impregnated with the filler-free resin, then the impregnated winding is cooled until the unhardened resin adhering to the external surface of the winding has a paste-like or at most viscous consistency, the excess of resin is removed by mechanical means from the winding, and then the impregnated winding thus freed from excess resin is provided with an outer covering of resin containing filler in a mould constituting the final outer enclosure and the resin of the outer covering is hardened.

The impregnation is advantageously carried out by degassing and freeing from moisture the winding under reduced pressure, if desired, at a raised temperature, and then embedding the winding in a filler-free resin which is liquid at the temperature used. After the impregnation under reduced pressure, the penetration of the filler free resin into the winding may be further assisted by the application of pressure, for example, by inert gas under superatmospheric pressure. Due to this application of pressure the quantity of the impregnating composition introduced into the winding is increased.

The embedding of the winding with filler-free resin can be carried out either in a separate sheet metal mould by immersing the mould in a boiler or by the so-called centrifugal casting process. The penetration of the filler-free resin into the winding can be assisted by the application of pressure, for example, by means of an inert gas under superatmospheric pressure. The removal of the cooled and viscous or paste-like filler-free resin may be carried out manually with a spatula, or by stripping with a gauge or by means of a blast of compressed air.

The paste-like or at most viscous consistency must be such that, when the winding is removed from the mould and after removal of the excess resin, there is no risk of resin flowing away from the outer layers or parts of the winding and thus forming voids that do not subsequently close up. In general the ability of a filler-free resin or a mixture thereof with a hardener to cool to a paste-like or at most viscous consistency depends on the fact that the hardener or the components causing hardening crystallise out, but can redissolve in the resin when heated again. In the crystallized condition the hardener has no hardening action on the resin and the composition can be stored in this condition without hardening taking place even after long periods.

Instead of the filler-free resin there may be used to impregnate the winding a resin that has been extended with a filler, provided that the mixture behaves in the same manner as filler-free resin.

The casting of the resin admixed with filler about the winding, after the excess resin has been removed, must be carried out in such manner that reliable adhesion between the impregnated winding and the outer covering is achieved without the existence of a void or fissures.

The attainment of an impregnation free from voids and therefore not subject to the risk of glow discharges, and also the adhesion of the outer covering to the winding, can be still further enhanced by applying superatmospheric pressure to the outer surface of the composition being cast about the impregnated winding, which casting operation may initially be carried out under reduced pressure.

As the hardenable impregnating and covering compositions undergo a certain amount of shrinkage due to the reaction that takes place during hardening, it is of advantage so to select the filler-free resin and the castable covering composition that the latter composition hardens after the impregnating composition has solidified. In order to bring about a forced flow of the impregnating resin, which is enclosed within the winding and the volume of which diminishes due to the chemical reaction, and also to ensure an absolutely tight enclosure of the winding by the covering composition the application of superatmospheric pressure is continued until the covering composition is solidified. When the resin begins to harden superatmospheric pressure may be cut off. As a medium exerting superatmospheric pressure there may be used dry compressed air or nitrogen or another inert gas.

Examples illustrating the invention are given below.

The advantages of the method of this invention arise firstly from the fact that substantially no or inappreciable losses of filler-free resin occur, because the resin removed from the impregnated winding after it has been cooled can be used again owing to its low temperature, as substantially no hardening has taken place. The filler-containing resin which is introduced into the final mould, owing to its higher temperature and greater density, displaces the thin layer of filler-free resin still adhering to the outer surface of the winding and thus comes into strong contact with the outer surface of the winding. This is important in order to produce a thoroughly mechanically robust winding, for example, in a coil body or current or voltage changer or transformer. Thus, the risk, which exists in the 2-stage method hereinbefore referred to, of stresses occurring between the inner impregnated body and the outer covering, which may lead to the formation of voids, is avoided.

Furthermore, the method of this invention is considerably simpler than the method hereinbefore referred to in which the impregnation and covering operations are carried out in vacuo in the same mould. The extremely cumbersome apparatus for casting, displacing, draining off and deaerating the different castable compositions is dispensed with or at least very considerably simplified. Moreover, the considerable loss of unusable filler-free resin composition that occurs in that method, is avoided.

The evacuation and impregnation are advantageously carried out at a raised temperature, generally at a temperature within the range of about 100–120° C., and the removal of the excess of impregnating composition can be carried out at room temperature or at least at a temperature which enables the removal to be carried out manually without the risk of burns. The synthetic resin used for impregnation must be sufficiently liquid at the raised temperature of impregnation in order to ensure penetration into all the interstices of the winding, and during cooling to the removal temperature at most assume a viscous or advantageously a pastelike consistency.

The following examples illustrate the invention, the parts being by weight. It will be understood that not only the castable resins mentioned in the examples may be used but other hardenable compositions provided that they undergo the above-mentioned necessary change in consistency within the necessary temperature range.

*Example 1*

The winding of a voltage changer was placed in a sheet metal mould. Within the mould the winding was separated in such manner that it was spaced on all sides and at the bottom from the wall of the mould by a distance of about 1 centimeter. The winding and mould were first preheated to 120° C. and then degassed and freed from moisture in a vacuum vessel heated at about 120° C.

At the same time a castable resin (filler-free resin) was prepared by mixing 100 parts by weight of an epoxy-resin having an epoxide content of about 4.6 epoxide equivalents per kilogram, and obtained by condensing 4:4'-dihydroxydiphenyl-dimethylmethane with epichlorohydrin in the presence of an alkali, with 65 parts of a hardener prepared from 35 parts of phthalic anhydride and 65 parts of tetrahydrophthalic anhydride. Before being mixed with the hardener the epoxy resin was preheated to 100° C., degassed at that temperature under a reduced pressure of about 0.5 mm. of mercury for about one hour, while stirring, and then the hardener was added.

The castable resin so obtained was rapidly poured into the sheet metal mould which was under a pressure of about 0.2 mm. of mercury, so that the level of the liquid resin was about 2 cm. above the winding. The vacuum was previously brought to a value of about 1.5 mm. of mercury by introducing dry air (dried by passing it over blue silica gel). When the pouring was complete, the mould was maintained for 30 minutes under the last mentioned pressure. The vacuum in the impregnation vessel was then cut off and replaced for 10 minutes by the pressure of dry air at two atmospheres (gauge) pressure.

The sheet metal mould containing the winding was withdrawn from the impregnation vessel and allowed to cool to room temperature. When it had cooled, the sheet metal mould was heated at its outer surface to about 50° C. until the winding could be withdrawn from the mould. The resin adhering to the exterior of the winding was then removed by means of a spatula.

The winding, from which the excess resin had been removed, was inserted in the casting mould, which was preheated to 50° C. and corresponded to the desired external shape, and the whole evacuated to a pressure of 1 mm. of mercury in a vessel heated to 130° C. A castable resin composition extended with quartz meal was then immediately poured into the mould under reduced pressure. This composition consisted of 100 parts of epoxy-resin and 30 parts of the aforesaid hardener, extended with 200 parts of quartz meal. The mixture was previously deaerated at about 130° C. under reduced pressure.

The epoxy resin was prepared in the same manner as the resin used for the impregnation, but it had an epoxide content of 2.3 to 2.6 epoxide equivalents per kilogram.

The mould into which the resin compositions had been poured was allowed to stand for ¼ hour under a pressure of 3 millimeters of mercury, then the mould was removed from the vacuum vessel, and inserted in an oven having a temperature of 130° C. for 20 hours to bring about hardening. The finished winding having an outer covering was then removed from the mould and allowed to cool slowly.

The winding thus obtained was subjected to the usual electrical tests, such as measurements of the insulation of the layers, insulation from earth, impact stress and tendency to glow at radio frequency, and excellent results were obtained.

*Example 2*

A winding was impregnated and provided with a covering in the manner described in Example 1, except that after pouring the resin into the impregnation mould, the reduced pressure was cut off immediately and replaced by dry compressed air under a pressure of two atmospheres gauge. Similarly, after the mould in which the outer casting was carried out had been filled, the reduced pressure was shut off immediately and the covering composition was subjected to dry compressed air under two atmospheres (gauge) pressure.

By this procedure, on the one hand, the pot life of the impregnating resin was better utilized and, on the other, the occurrence of voids, fissures, etc. in the cast body during the hardening operation was prevented by the application of pressure.

What is claimed is:

A process for impregnating and encapsulating electrical conductors with hardenable synthetic resins, comprising the steps of impregnating an electrical conductor with an unhardened hardenable liquid synthetic resin containing a hardening agent, cooling the impregnated conductor to a temperature where the hardening agent separates in crystalline form from the resin, superficially mechanically removing the externally adhering resin from the conductor, placing the impregnated conductor thus freed from excess resin into a mold corresponding to the shape of the final encapsulating exterior covering, introducing into said mold a filler-containing unhardened hardenable resin, hardening both the impregnating and the filler-containing resin and removing the encapsulated conductor from the mold.

References Cited in the file of this patent

UNITED STATES PATENTS

| | | |
|---|---|---|
| 2,484,215 | Foster | Oct. 11, 1949 |
| 2,695,856 | Firth | Nov. 30, 1954 |
| 2,949,640 | Collins et al. | Aug. 23, 1960 |

FOREIGN PATENTS

| | | |
|---|---|---|
| 802,599 | Great Britain | Oct. 8, 1958 |